(12) United States Patent
Lin et al.

(10) Patent No.: US 6,256,836 B1
(45) Date of Patent: Jul. 10, 2001

(54) EASY-RELEASE HINGE SYSTEM

(75) Inventors: Cheng-Yi Lin, Pan-chiao; Shih-Yih Tang, Taipei, both of (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/280,290

(22) Filed: Mar. 29, 1999

(51) Int. Cl.$^7$ ..................................... E05D 7/10
(52) U.S. Cl. ................................. 16/263; 16/340
(58) Field of Search .............. 16/259, 262, 263, 16/340

(56) References Cited

U.S. PATENT DOCUMENTS

| | | | | |
|---|---|---|---|---|
| 1,341,063 | * | 5/1920 | McQueen | 16/386 |
| 3,015,126 | * | 1/1962 | Ahlgren | 16/386 |
| 4,542,558 | * | 9/1985 | Brockhaus | 16/263 |
| 4,570,290 | * | 2/1986 | Anderson | 16/229 |
| 4,854,009 | * | 8/1989 | Brockhaus | 16/263 |
| 4,951,350 | * | 8/1990 | Nunes | 16/263 |
| 5,715,576 | * | 2/1998 | Liu | 16/342 |
| 5,724,704 | * | 3/1998 | Seo | 16/254 |
| 6,076,232 | * | 6/2000 | Saida et al. | 16/342 |

* cited by examiner

Primary Examiner—Anthony Knight
Assistant Examiner—Alison K. Pickard
(74) Attorney, Agent, or Firm—Christensen O'Connor Johnson Kindness PLLC

(57) ABSTRACT

An improved hinge system is provided to couple a first component and a second component. The hinge system includes a first fastener (200), a clutch (300), and a second fastener (500). The first fastener includes a first end (220) adapted to be secured to the first component, and a second end defining a first cylindrical portion (210). The clutch includes a first end defining a second cylindrical portion (320) including a first cavity (325) therein, and a boss (330). The first cavity is sized to tightly yet rotatably receive the first cylindrical portion of the first fastener within, so as to form an axle of the hinge. The second fastener includes a first end forming a third cylindrical portion (553) defining a second cavity (550) therein, and a second end (520) adapted to be secured to the second component. The second cavity is sized to slidably receive the boss of the clutch within, in such a manner that the second cavity and the boss cannot axially rotate with respect to each other. Thus, the hinge system of the present invention not only allows the first fastener and the clutch to axially rotate with respect to each other to function as a hinge, but also permits the clutch, and thus the first fastener, to be slidably separated from the second fastener when desired.

11 Claims, 4 Drawing Sheets

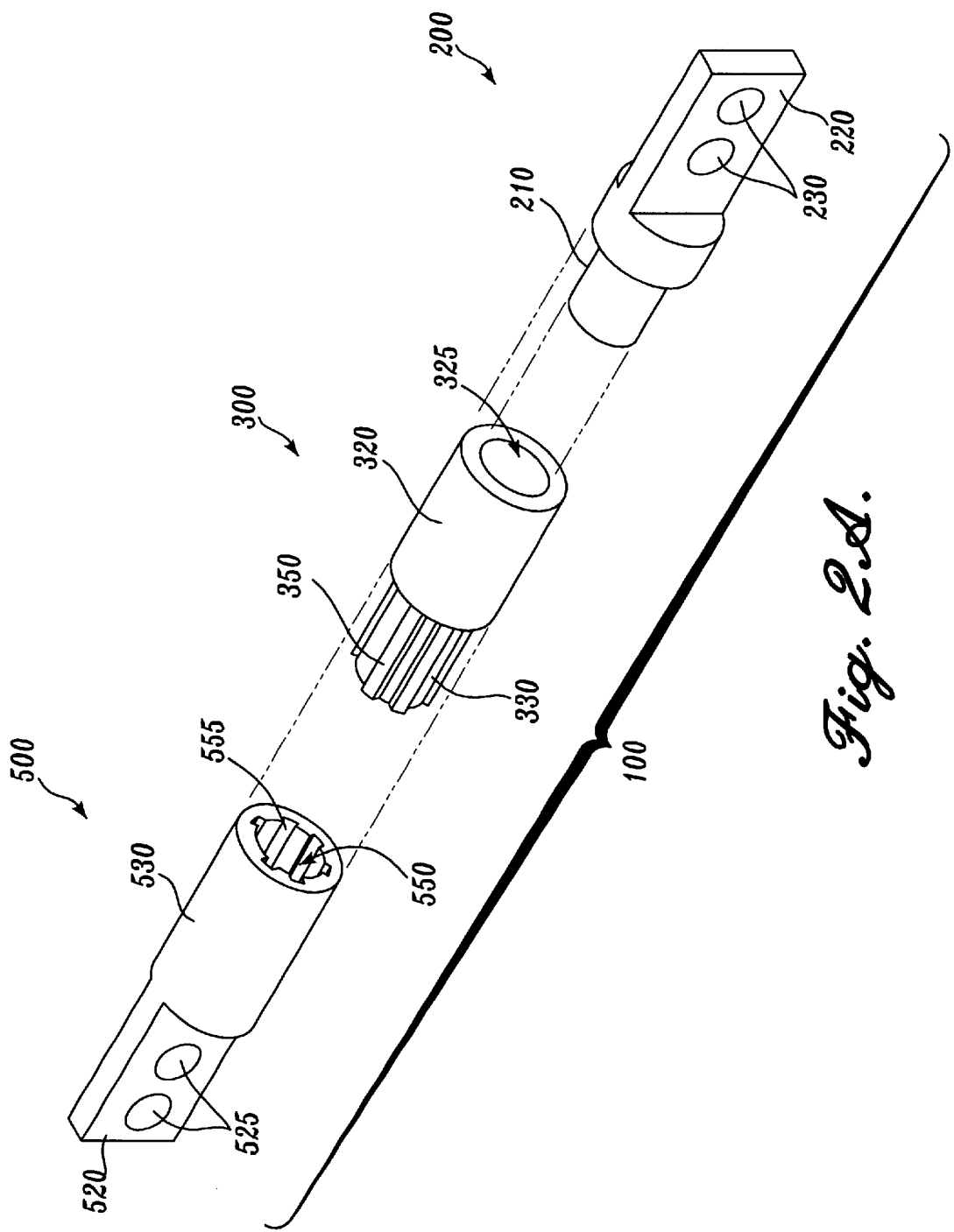

EASY-RELEASE HINGE SYSTEM

FIELD OF THE INVENTION

The present invention relates to a hinge system and, more specifically, to a hinge system used to couple two components together while permitting easy separation of the two components if desired, such as a screen from the main body of a portable computer.

BACKGROUND OF THE INVENTION

In a portable computer, a main body and a screen are typically coupled with a hinge. A hinge provides an axle along which a screen may open up away from a main body or close down toward the main body. FIG. 1 illustrates a conventional hinge 10 formed with two parts: a screen fastener 30 and a main body fastener 50. The screen fastener 30 includes a first connection plate 32 at one end, which defines two threaded holes 35 therethrough. The first connection plate 32 is fastened to a display using two screws (not shown). The other end of the screen fastener 30 includes a first cylindrical portion 36 defining a cavity 38 therethrough. The main body fastener 50 includes a boss 60, a second cylindrical portion 70, and a second connection plate 80. The second connection plate 80 defines two threaded holes 85 therethrough, and may be fastened to a main body using two screws (not shown). The external diameter of the boss 60 matches the internal diameter of the cavity 38 defined through the screen fastener 30, so that when the boss 60 is inserted in the cavity 38, the boss 60 and the cavity 38 form a "tight fit". Due to this "tight fit", the screen fastener 30 and the main body fastener 50 are not easily separated and, yet, may axially rotate with respect to each other. To assemble a main body and a screen together, either fastener of the hinge 10 is fastened to one of the main body or the display without a covering, using screws. Then the covering is placed over either the main body or the display, to which the fastener has been just secured. Thereafter, the other fastener of the hinge 10 is fastened to the other of either the main body or the display without a covering, using screws. Finally, the covering is placed on the other of either the main body or the display, to complete the assembling process. When a screen and a main body need to be separated for checking or maintenance purposes, one must typically open up the screen, undo the screen covering, and unfasten the screws. Such dismantling process is cumbersome and tedious. Further, since a covering needs to be removed to unfasten screws, the process involves a risk of damaging exposed electrical circuit boards or other internal structures.

SUMMARY OF THE INVENTION

To overcome the disadvantages associated with the currently available hinge as described above, the present invention provides an improved hinge system that allows for easy dismantling of a screen and a main body of a portable computer.

The hinge system of the invention is used to couple a first component and a second component together in an axially rotatable manner with respect to each other, for example, a screen and a main body of a portable computer. The hinge system includes a first fastener, a clutch, and a second fastener. The first fastener includes a first end adapted to be secured to the first component, and a second end defining a first cylindrical portion. The clutch includes a first end defining a second cylindrical portion including a first cavity therein, and a boss. The first cavity is sized to tightly yet rotatably receive the first cylindrical portion of the first fastener within, so as to form an axle of the hinge. The second fastener includes a first end forming a third cylindrical portion defining a second cavity therein, and a second end adapted to be secured to the second component. The second cavity is sized to slidably receive the boss of the clutch within, in such a manner that the second cavity and the boss cannot axially rotate with respect to each other. Thus, the hinge system of the present invention not only allows the first fastener and the clutch to axially rotate with respect to each other to function as a hinge; but also permits the clutch, and thus the first fastener, to be slidably separated from the second fastener when desired.

In one aspect of the invention, the radial surface of the boss of the clutch defines at least one axially extending ridge thereon. The second cavity of the second fastener defines at least one groove sized to receive the at least one ridge provided on the radial surface of the boss. When the ridge of the boss and the groove of the second cavity are matched together, the boss and the second cavity cannot axially rotate with respect to each other, while the boss can be slid out of the second cavity along the ridge and the groove.

In another aspect of the invention, the first component to be coupled with the hinge system includes a protruding edge having a first width along the edge, and the second component includes an indented edge for receiving the protruding edge. The indented edge has a second width along the edge, which is greater than the first width. When the hinge system of the present invention is applied to couple the protruding edge and the indented edge, a gap is provided due to the difference between the first and second widths. This gap provides room for the clutch and, thus, the first fastener to be slid in and out from the second fastener. After the clutch is fully received within the second fastener, a stopping piece may be provided to fill the gap, to prevent the clutch and, thus, the first fastener from sliding out of the second fastener.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein

FIG. 2A is a perspective view of an improved hinge system in accordance with the present invention;

DETAILED DESCRIPTION OF THE PREFERRED EMBODIMENT

The present invention provides an improved hinge system for coupling a first component and a second component together, so as to allow the two components to open and close with respect to each other, while also allowing the two components to be easily separated when desired. Though the following describes an improved hinge system as used for coupling a main body and a screen of a portable computer, it should be understood that the hinge system of the present invention may be used for coupling any forms of two components together.

Figure 1:
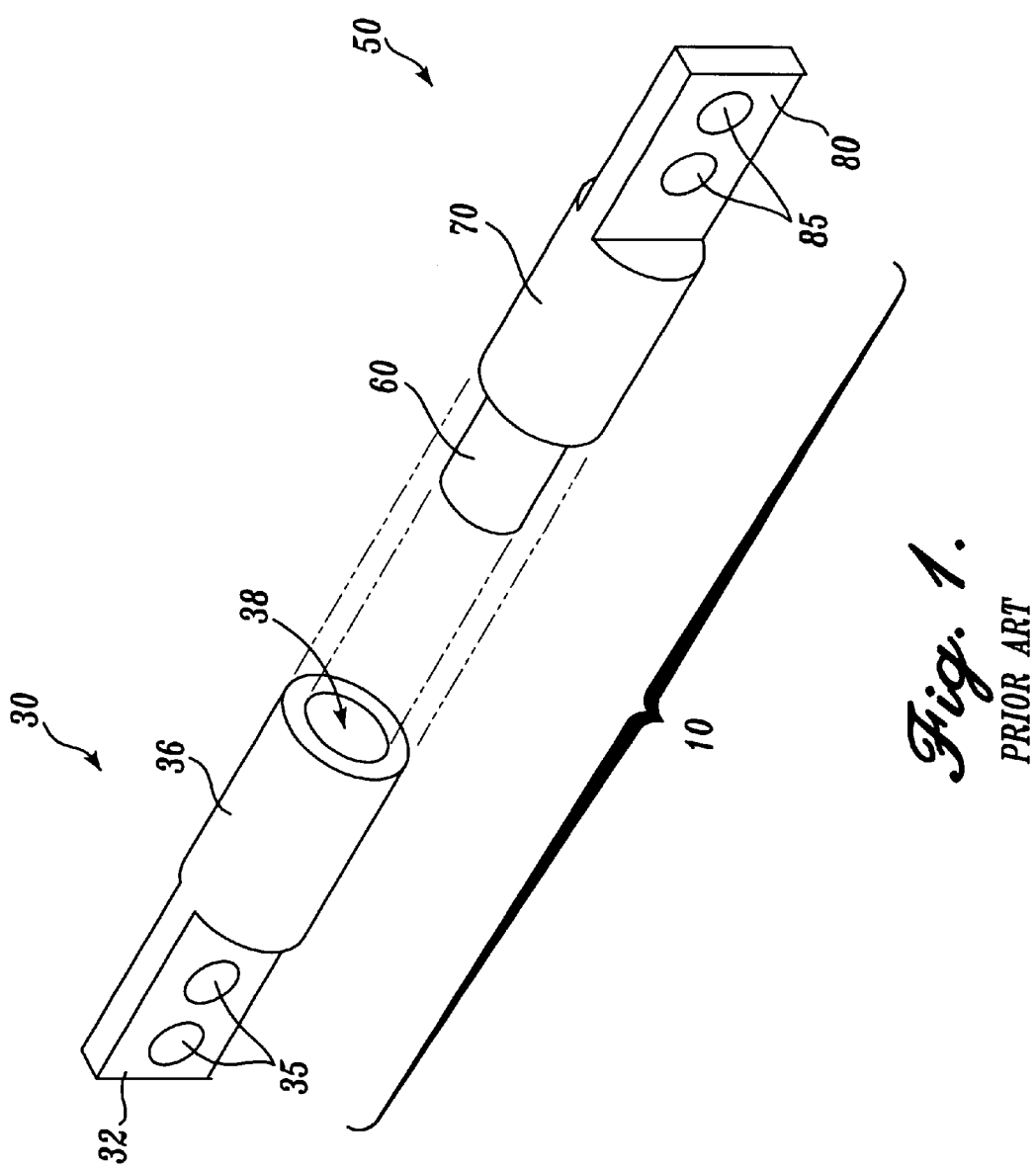
FIG. 1 is a perspective view of a conventional hinge.
Figure 2B:
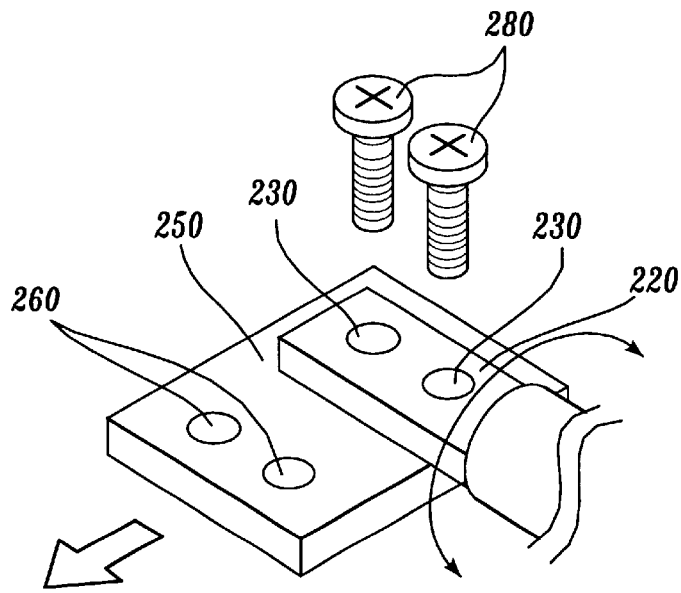
FIG. 2B illustrates one embodiment of an attachment part in accordance with the present invention.
Figures 3A, 3B:
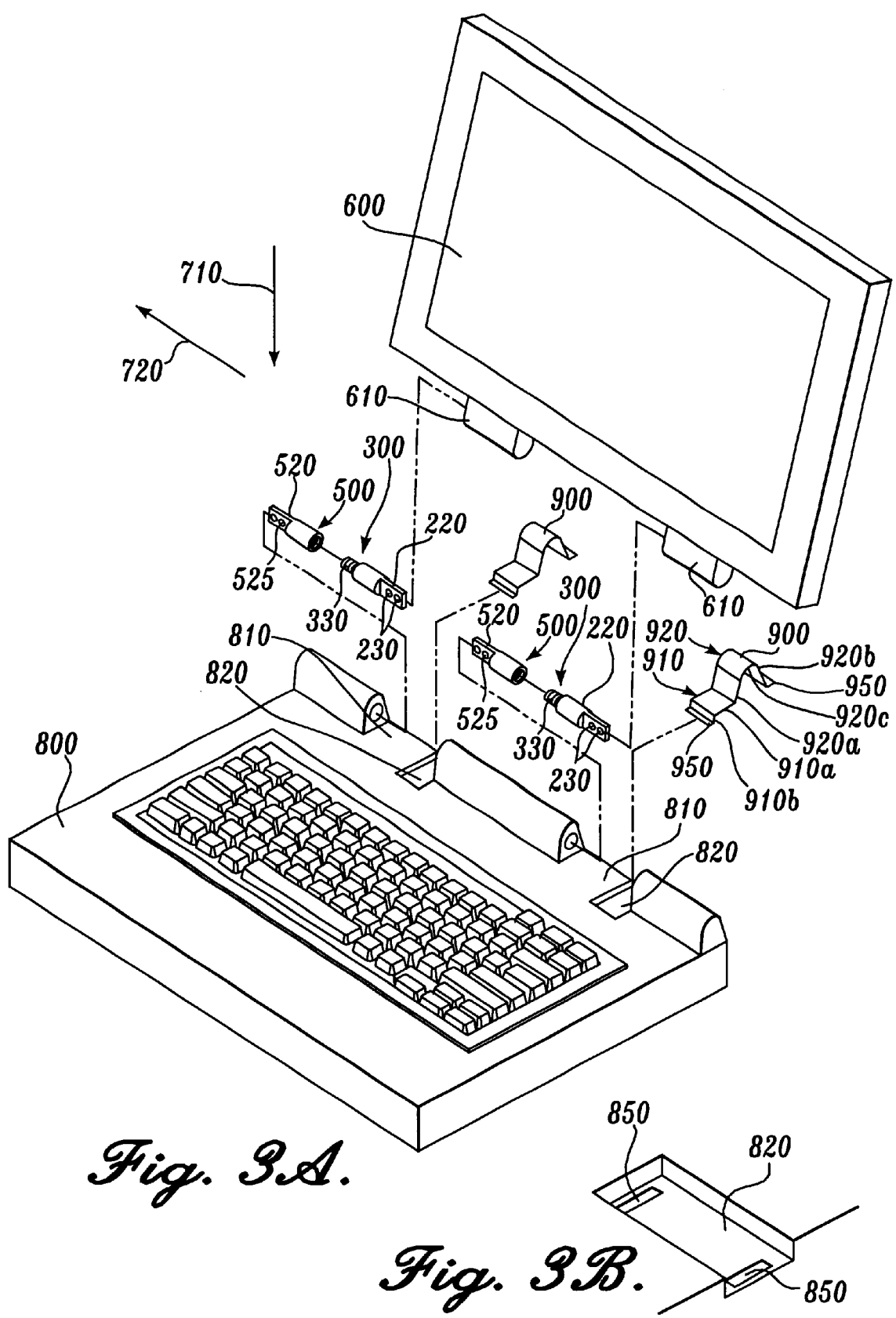
FIG. 3A is an exploded view of a portable computer, which is assembled using the improved hinge system of FIG. 2A, in accordance with the present invention.
FIG. 3B illustrates a recess provided for receiving the stopping piece of FIG. 2B, in accordance with the present invention.

An improved hinge system of the present invention may include a hinge portion 100 as illustrated in FIG. 2A, and an optional stopping piece 900 (FIG. 3A). In FIG. 2A, the hinge portion 100 includes three parts: a screen fastener 200, a frictional clutch 300, and a main body fastener 500. The screen fastener 200 includes a first connection plate 220 and a first cylindrical portion 210. The first connection plate 220 is provided to be fastened to a screen (not shown) of a portable computer. In the embodiment shown in FIG. 2A, the connection plate 220 defines two holes 230, for receiving screws therethrough for fastening the screen fastener 200 to a screen. It should be understood that the first connection plate 220 may be attached to a screen using any other suitable means, as apparent to those skilled in the art.

The frictional clutch 300 includes a second cylindrical portion 320 and a boss 330. The second cylindrical portion 320 defines a first cavity 325 therethrough, whose internal diameter matches the external diameter of the first cylindrical portion 210 of the screen fastener 200. The first cylindrical portion 210 is inserted into the first cavity 325 and fit tightly together, while allowing the two to axially rotate with respect to each other. In the present description, the term "tightly" means that the tolerance between the two components, the first cylindrical portion 210 and the first cavity 325 in this case, is approximately ±0 mm. The first cylindrical portion 210 and the first cavity 325 thus cooperatively form an axle, which allows a screen to flip open outwardly from or close downward toward a main body of a portable computer (not shown). The boss 330 of the frictional clutch 300 includes at least one ridge 350 axially extending along the radial surface of the boss 330. In the embodiment illustrated in FIG. 2A, a plurality of ridges 350 are provided so that a cross section of the boss 330 is generally gear-shaped. The number and shape of the ridges 350 and, thus, the cross section of the boss 330, are not limited to this illustrated example, and may take various other forms, as more fully described below.

The main body fastener 500 includes a third cylindrical portion 530 and a second connection plate 520. The third cylindrical portion 530 defines a second cavity 550 therethrough. The internal surface of the second cavity 550 defines at least one axially extending groove 555, which is sized and shaped to receive the at least one ridge 350 of the frictional clutch 300 within. In FIG. 2A, a plurality of grooves 555 are provided to receive the plurality of ridges 350. The plurality of ridges 350 and the grooves 555 are matched together when the boss 330 is inserted into the second cavity 550 and when the boss 330 is pulled out from the second cavity 555. In the present embodiment, a tolerance of the two dimensions of the boss 330 and the second cavity 550 is preferably between ±0.1 and ±0.2 mm, though a tolerance may be outside this range. The second connection plate 520 of the main body fastener 500 is fastened to a main body of a portable computer (not shown). For this purpose, in the embodiment of FIG. 2A, the second connection plate 520 defines two holes 525 therethrough for receiving screws. As before, it should be understood that any other suitable means may be used to attach the second connection plate 520 to a main body, as will be apparent to those skilled in the art. In one embodiment, a tolerance between the first cylindrical portion 210 of the screen fastener 200 and the first cavity 325 of the clutch 300 is less than a tolerance between the boss 330 of the clutch and the second cavity 550 of the main body fastener 500, so that, upon axial force being applied thereto, the boss 330 and the second cavity 550 separate before the first cylindrical portion 210 and the first cavity 325 separate.

The first connection plate 220 and the second connection plate 520 allow the hinge portion 100 to be connected to a screen and a main body, respectively, of a portable computer. It should be understood that the first connection plate 220 may be fastened to a main body, instead of a screen, and the second connection plate 220 may be fastened to a screen, instead of a main body, to achieve the purpose of the present invention. It should also be understood that the external shape of the first and second connection plates 220, 520 is not limited to what is illustrated in FIG. 2A, and may take various other external forms, as long as they serve to secure the hinge portion 100 to a screen and a main body.

Figure 2C:
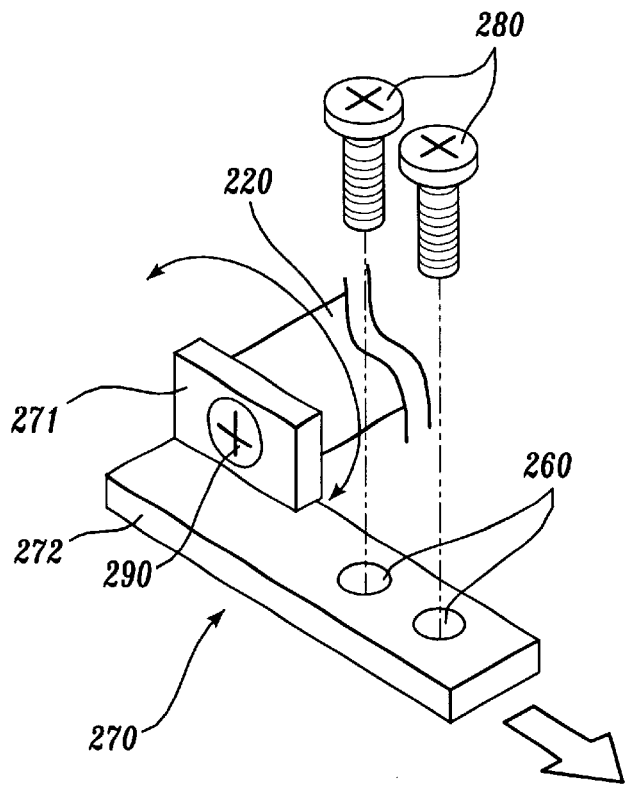
FIG. 2C illustrates another embodiment of an attachment part in accordance with the present invention.

Referring to FIGS. 2B and 2C, certain embodiments of coupling of the first connection plate 220 to a screen is explained. It should be understood that the following description is equally applicable to the coupling of the first connection plate 220 to a main body, or the coupling of the second connection plate 520 to a main body or a screen. In FIG. 2B, the first connection plate 220 is not attached to a screen directly but, instead, attached to an attachment part 250, which is to be secured to a screen. The attachment part 250 includes four holes 260 therethrough, and is secured to the first connection plate 220 using two screws 280 extending through the two holes 230 of the first connection plate 220 and the two holes 260 of the attachment part 250. The other two holes 260 of the attachment part 250 are used to fasten the attachment part 250 to a screen. As noted before, the second connection plate 520 may be attached to a main body, also indirectly, using the attachment part 250.

FIG. 2C illustrates another embodiment of an attachment part, which may be used to secure the first connection plate 220 to a screen invention. The first connection plate 220 is attached to a generally L-shaped attachment part 270. The L-shaped attachment part 270 includes a first surface 271 and a second surface 272, which meet perpendicularly with each other. The second surface 272 defines two holes 260 therethrough. The first connection plate 220 is attached to the first surface 271 using, for example, a rivet 290. The second surface is secured to a screen using two screws 280 extending through the two holes 260. Similarly, the second connection plate 520 may be attached to a main body, indirectly, using the L-shaped attachment part 270.

FIG. 3A illustrates a stopping piece 900 to be used cooperatively with the hinge portion 100 of the present invention. The stopping piece 900 includes an L-shaped portion 910 and a U-shaped portion 920. The L-shaped portion includes a long arm 910a and a short arm 910b. The U-shaped portion 920 includes a first straight arm 920a, a second straight arm 920b, and an arc 920c. The long arm 910a of the L-shaped portion 910 is connected to the first straight arm 910a of the U-shaped portion 920. The short arm 910b of the L-shaped portion 910 and the second straight arm 920b of the U-shaped portion both include a flange portion 950 at their respective ends. A width of the stopping piece 900 is defined as a dimension along the longitudinal edge of the flange portion 950.

FIG. 3A illustrates an improved hinge system of the present invention as applied in a portable computer including a screen 600 and a main body 800. The screen 600 includes two protruding edges 610. The main body 800 includes two indented edges 810 on its edge for receiving the protruding edges 610. The main body 800 further includes two recesses 820 located within the two indented edges 810.

The width of the indented edge 810, defined along its longitudinal length, is equal to the sum of the width of the protruding edge 610, also defined along its longitudinal length, and the width of the stopping piece 900. In assembly, the frictional clutch 300 of the hinge portion 100 is coupled to the screen fastener 200, and the screen fastener 200 is secured to the screen 600 by securing the first connection plate 220 to the screen using, for example, screws extending through the holes 230. Likewise, the second connection plate 520 is secured to the main body 800 using, for example, screws extending through the holes 525 to secure the main body fastener 500 to the main body. Thereafter, the protruding edges 610 of the screen 600 are aligned with the indented edges 810 of the main body 800. The protruding edges 610 are then moved in a first direction 710 toward the indented edges 810, downward toward the surface of the main body 800. After the protruding edges 610 come in contact with, and are received within the indented edges 810, the screen 600 is pushed sideways in a second direction 720, causing the boss 330 of the frictional clutch 300 to extend into the second cavity 550 of the main body fastener 500. When the boss 330 is fully received within the second cavity 500, a gap remains within the indented edge 810, which generally lies over the recess 820 and has a width equivalent to the width of the stopping piece 900.

To fill this gap, the stopping piece 900 is placed over the recess 820. Referring additionally to FIG. 3A, to securely place the stopping piece 900 in the recess 820, one may slightly bend the arc 920c of the U-shaped portion 920 by pressing the first and second straight arms 920a, 920b together using fingers or any suitable tools. Each recess 820 is provided with two grooves 850, to receive the flange portions 950 of the stopping piece 900 within. After the flange portions 950 are received within the grooves 850, one may release the first and second straight arms 920a, 920b to thereby cause the arc 920c to return to its original shape. The stopping piece 900 is thus firmly secured within the recess 820 and, hence, to the main body 800. This completes the assembling process of a portable computer using the improved hinge system of the present invention The purpose of the stopping piece 900 is to fill the gap, which is left behind after the protruding edges 610 of the screen 600 are received within the indented edges 810 of the main body 800 and fully pressed in the second direction 720. Therefore, it should be understood that the form of a stopping piece is not limited to what has been described herein, and may take various other forms, as long as such stopping piece serves the purpose of filling the gap as described above.

Still referring to FIG. 3A, to dismantle the screen 600 from the main body 800 of a portable computer, one may follow the steps described above in reverse order. Specifically, first, the stopping piece 900 is removed from the recess 820 provided within the indented edge 810, to create the gap. Then, the screen 600 is slid in the direction opposite the second direction 720 toward the gap, and is moved upward in the direction opposite the first direction 710. This completes the separation of the screen 600 from the main body 800.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A hinge system including an axle, used for coupling a first component and a second component together to allow the same to axially rotate with respect to each other along the axle, comprising:
   (a) a first component including a protruding edge having a first width;
   (b) a second component including an indented edge for receiving the protruding edge of the first component, the indented edge having a second width, the second width being greater than the first width;
   (c) a hinge portion including:
      (i) a first fastener including a first end and a second end, the first end being adapted to be secured to the first component, the second end defining a first cylindrical portion,
      (ii) a clutch including a first end and a boss, the first end including a second cylindrical portion defining a first cavity therein, the first cavity being sized to tightly yet rotatably receive the first cylindrical portion of the first fastener therein to form the axle of the hinge, the boss including a radial surface, and
      (iii) a second fastener including a first end and a second end, the first end including a third cylindrical portion defining a second cavity therein, the second cavity being sized to slidably receive the boss of the clutch therein, the second cavity and the boss being incapable of axially rotating with respect to each other, the second end being adapted to be secured to the second component; and
   (d) a stopping piece having a third width, the third width being approximately the difference between the first and the second widths.

2. The hinge system of claim 1, wherein at least one of the first end of the first fastener and the second end of the second fastener comprises a plate.

3. The hinge system of claim 1, wherein the first and second components are a screen and a main body, or a main body and a screen, of a portable computer, respectively.

4. The hinge system of claim 1, wherein the stopping piece includes an L-shaped portion having a short arm and a long arm, and a U-shaped portion having a first straight arm, an arc, and a second straight arm, the long arm of the L-shaped portion being attached to the first straight arm of the U-shaped portion.

5. The hinge system of claim 4, wherein the indented edge of the second component includes a recess sized to received the stopping piece therein.

6. The hinge system of claim 1, further comprising an attachment part being adapted to be secured to both the first end of the first fastener and the first component, or to both the second end of the second fastener and the second component.

7. The hinge system of claim 6, wherein the attachment part is generally L-shaped.

8. The hinge system of claim 1, wherein the radial surface of the boss of the clutch defines at least one ridge extending axially, and the second cavity of the second fastener defines at least one groove sized to receive the at least one ridge of the boss.

9. The hinge system of claim 8, wherein a plurality of ridges are provided on the radial surface of the boss, and a plurality of grooves sized to receive the plurality of ridges, respectively, are defined within the second cavity.

10. The hinge system of claim 1, wherein a tolerance between the first cylindrical portion of the first fastener and the first cavity of the clutch is less than a tolerance between the boss of the clutch and the second cavity of the second fastener, so that upon axial force being applied thereto, the boss and the second cavity separate before the first cylindrical portion and the first cavity separate.

11. The hinge system of claim 10, wherein the tolerance between the boss of the clutch and the second cavity of the second fastener ranges between approximately ±0.1 and ±0.2 mm.

* * * * *